United States Patent [19]

Dorner et al.

[11] Patent Number: 4,836,297
[45] Date of Patent: Jun. 6, 1989

[54] HANDHELD PORTABLE TOOL HAVING AN INTERNAL COMBUSTION ENGINE

[75] Inventors: Wolfgang Dorner, Rottenburg am Neckar; Helmut Lux, Bittenfeld; Reinhold Fink, Fellbach, all of Fed. Rep. of Germany

[73] Assignee: Andreas Stihl, Waiblingen, Fed. Rep. of Germany

[21] Appl. No.: 943,761

[22] Filed: Dec. 19, 1986

[30] Foreign Application Priority Data

Dec. 24, 1985 [DE] Fed. Rep. of Germany ....... 3546029

[51] Int. Cl.$^4$ .............................................. E21B 3/00
[52] U.S. Cl. .................................... 173/162.1; 74/603
[58] Field of Search ......................... 173/162.1, 162.2; 74/594.5, 603, 604

[56] References Cited

U.S. PATENT DOCUMENTS

3,525,373  8/1970  Kobayashi ..................... 173/162
4,632,072 12/1986  Brogdon ........................ 74/603

Primary Examiner—Frank T. Yost
Assistant Examiner—Willmon Fridie, Jr.
Attorney, Agent, or Firm—Walter Ottesen

[57] ABSTRACT

A handheld portable tool has a drive unit connected to the handle via damping elements. The drive unit includes an internal combustion engine having a crankshaft. To reduce the vibration transmitted by the drive unit to the handles, a static or dynamic imbalance of defined position and quantity is provided on the crankshaft of the engine, as a result of which vibration in the handles is considerably reduced. An imbalancing weight may for instance be provided in the fan wheel, so that the crankshaft and its elements are manufactured and balanced in the same manner as before, and only the fan wheel has to be structurally modified.

13 Claims, 7 Drawing Sheets

HANDHELD PORTABLE TOOL HAVING AN INTERNAL COMBUSTION ENGINE

FIELD OF THE INVENTION

The invention relates to a handheld portable tool driven by an internal combustion engine such as a chain saw, an abrasive cut-off tool, a brushcutter or the like. The tool has a drive unit which is connected via at least one damping element with at least one handle of the tool. The drive unit includes a piston engine with a crankshaft and elements fixedly mounted on the crankshaft. The crankshaft is provided with counterbalancing for the piston.

BACKGROUND OF THE INVENTION

In tools of this kind, vibrations are generated by the drive unit, or in other words by the internal combustion engine and the elements that are moved therewith in a rotational or translational manner, and these vibrations are at least partly transmitted to the handle or handles of the tool as well. As a result, the person using the tool experiences vibration to a sometimes considerable extent, which can be not only unpleasant but even unhealthy. It is well known that these vibrations at the handles also affect the work output, because especially when work extends over long periods, the user's hands and arms tend to become cramped. For a long time, there have therefore been attempts to keep the drive unit vibrations as low as possible and to insulate the handle elements from vibration to the greatest possible extent. To this end, the drive unit is as a rule supported in a damped manner with respect to the housing or at least with respect to the handle or handles; this is attained by anti-vibration elements, that is, vibration dampers.

The vibration dampers usually comprise elastic material and are disposed between the exciter system and the handles or housing of the tool to attain maximum possible vibration damping. Despite numerous experiments, it has been found, however, that virtually complete insulation of the handles from vibration is impossible, and that the vibration insulation attained is not completely satisfactory, so that the tool user is still subjected to considerable stress from these vibrations, which although diminished continue to be present.

To reduce these vibrations still further, the oscillating masses of the engine have been reduced to the greatest possible extent by means of suitable structural configuration (lightweight construction) and by a suitable selection of material (light metal and light metal alloys). By this means, it has been possible to lessen the vibration in the handle element, but not to eliminate it.

To increase vibration insulation between the exciter system (drive unit) and the handles, the damping members, which were made of rubber or steel springs, have been replaced by softer elements. By this means, although it was possible to increase the degree of insulation considerably, still this had the disadvantage that the required guidance of the tool was impaired. The damping elements were therefore adapted to be harder, but in adaptation a compromise between accurate guidance and vibration damping must always be made. Although hard dampers enable good, direct guidance of the tool by the operator, they transmit a considerable portion of the vibration originating in the drive unit, while with soft dampers this situation is precisely the opposite.

According to prevailing opinion thus far, the vibrations transmitted to the handle are substantially dependent on the quality of balancing of the drive unit. In this respect the attempt is made to keep imbalance of the rotating structural parts of the engine as low as possible [on this aspect, see also VDI-Richtlinie 2060 (German Engineers Association Guideline 2060)], and for this reason, two well-defined crank arms are for instance provided on the crankshaft, the piston rod being pivotably connected between them. The balancing weights in the crank webs serve to equalize the inertial forces of the piston at top dead center; they are therefore arranged such that they counteract these forces. The crankshaft itself, along with the elements mounted on it, such as a fan wheel and clutch, are also balanced statically and dynamically as much as possible.

SUMMARY OF THE INVENTION

It is an object of the invention to provide a handheld portable tool of the above-described type by structurally simple and inexpensive manufacturing means, so as to enable a significant reduction of the remaining vibrations in the handle or handles and thereby enable the person using the tool to better handle and manipulate the tool.

This object is attained in a tool of this type by providing an imbalance of defined location and quantity, on the unit which includes the crankshaft and parts fixedly mounted thereon. This imbalance is defined by position and amount and is in addition to the counterbalance referred to above.

By means of this imbalance of the crankshaft, a considerable reduction of vibration in the handle or handles is attained. The embodiment according to the invention is inexpensive and simple to produce because an imbalancing weight or a suitable recess acting as an imbalance is provided on only one part of the crankshaft, without requiring structural changes in the drive unit or other parts of the tool.

The imbalance of the crankshaft and of the elements fixedly connected thereto may be static, for instance, by adding or subtracting mass on one side on an element mounted on the crankshaft; however, a purely dynamic imbalance is also sufficient for generating the desired reduction in vibration in the handles. The imbalancing weight or weights may be provided on the fan wheel, on the crankshaft, on one or both crank arms, or on the rotating part of the clutch, alone or in combination. Preferably the imbalancing weights are disposed approximately at an angle of from 45° to 135°, preferably approximately at right angles to the cylinder axis, when the piston is at top dead center. Other arrangements are also possible; what is important, however, is that by means of the imbalance, a torque of defined magnitude and direction about the center of gravity of the engine is generated, which at top dead center of the piston is effective about the upwardly extending axis of the cylinder.

From an engineering and manufacturing standpoint, it is convenient to provide a single imbalancing weight on the fan wheel, because with this embodiment, the crankshaft and the elements connected with it are manufactured and balanced in the usual manner; all that has to be done is to mount an imbalancing weight of defined position and mass on the fan wheel thereby generating the desired imbalance.

In a feature of the invention in which only one crank arm is provided on the crankshaft and the missing second arm is replaced by a suitable embodiment of the fan wheel in terms of weight, it may be advantageous in manufacturing terms to mount the imbalancing weight in such a way that at top dead center of the piston, it is disposed approximately 180° after top dead center with respect to the axis of rotation and the direction of rotation of the crankshaft. In this case, the mass of the fan wheel, which replaces the second crank arm, is enlarged or reduced accordingly.

BRIEF DESCRIPTION OF THE DRAWINGS

The invention will now be described with reference to the drawings, wherein.

DESCRIPTION OF THE PREFERRED EMBODIMENTS OF THE INVENTION

Figure 1:
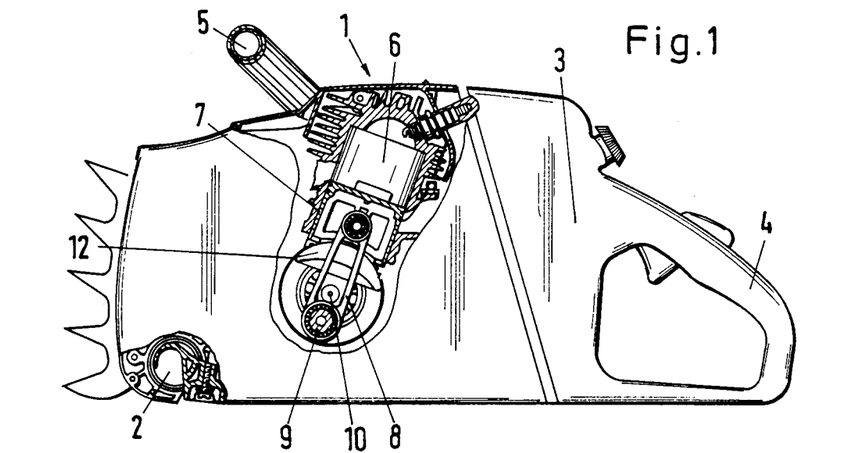
FIG. 1 is a side elevation view of the power head of a chain saw with portions of the housing wall broken away to show the engine and an anti-vibration element.
Figure 2:
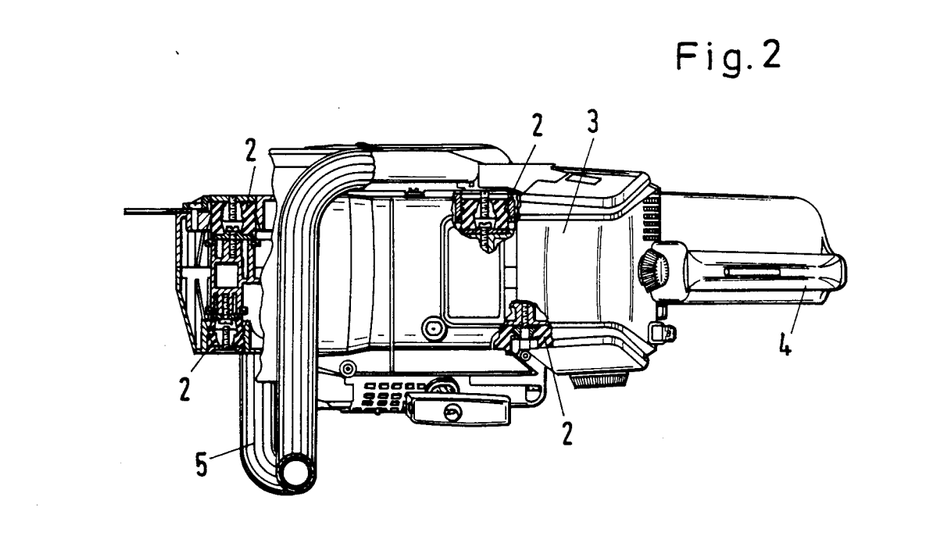
FIG. 2 is a plan view of the power head of FIG. 1 with portions of the housing wall broken away to expose anti-vibration elements.

The portable tool schematically shown in FIGS. 1 and 2 is a chain saw of which the guide bar and the revolving saw chain are not shown here. The tool has a drive unit 1, which in this embodiment is connected to the housing 3 via four anti-vibration elements 2 (damping elements). Two handles 4 and 5 are attached to the housing 3 and serve to hold and guide the tool. Via the anti-vibration elements 2, the drive unit 1 is vibration-damped with respect to the housing 3 and thus with respect to handles 4 and 5 as well.

The drive unit 1 comprises an internal combustion engine having one cylinder 6 with a piston 7 guided therein, the piston being connected via a piston rod 8 with a crankshaft 9. The crankshaft 9 is journalled such that it is rotatable about its axis of rotation 10, which is disposed perpendicular to the cylinder axis 11 shown in FIG. 4. The crankshaft 9 of this tool has two well-defined crank webs 12, between which the piston rod 8 is supported. The crank webs 12 are embodied as a "counterweight" and serve to equalize mass for the piston 7 as it moves up and down during operation. The crank webs 12 are disposed in a known manner such that upon movement of the pistons 7 toward top dead center, a correspondingly counteractive force is generated at the crankshaft 9. The illustration of FIG. 1 shows the piston in its bottom dead center position.

In the tool shown in FIGS. 1 and 2, a clutch 13 (FIG. 3) is mounted on one end of the crankshaft 9, and via the clutch, the work performed by the engine is transmitted to the drive sprocket, not shown, which drives the saw chain. A fan wheel 14 is provided on the other end of the crankshaft 9 and is mounted firmly on the crankshaft 9. The fan wheel 14 provides the flow of cooling air for cooling the cylinder 6 during operation. The embodiment of the crankshaft 9 with the well-defined crank webs 12, with the clutch 13 seated thereon and with the fan wheel 14 firmly connected to the crankshaft is shown schematically in FIGS. 3 to 12. These figures are highly simplified and show only exemplary embodiments for the disposition of one or more imbalancing weights 15.

The following description applies only to the arrangement of imbalancing weights. An imbalancing weight 15 of this kind may also be replaced by a corresponding recess of equivalent mass, offset by 180° with respect to the axis of rotation of the crankshaft 9, and for this reason the following discussion describes solely the mounting of imbalancing weights.

Figure 3:
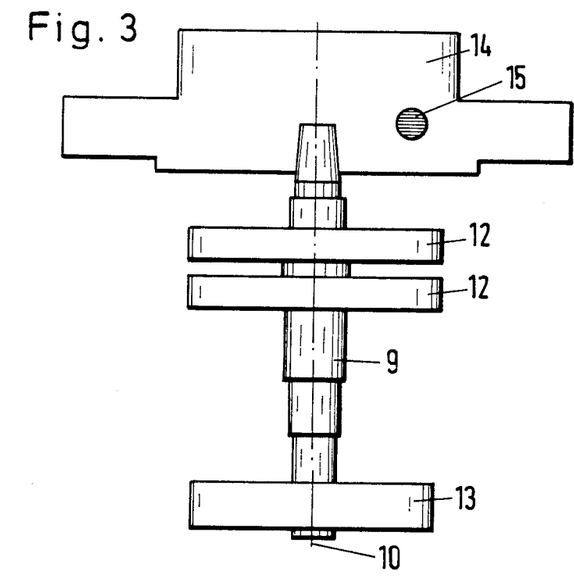
FIG. 3 is an enlarged and greatly simplified view of the crankshaft of the tool shown in FIGS. 1 and 2 showing the arrangement of the imbalancing mass.
Figure 4:
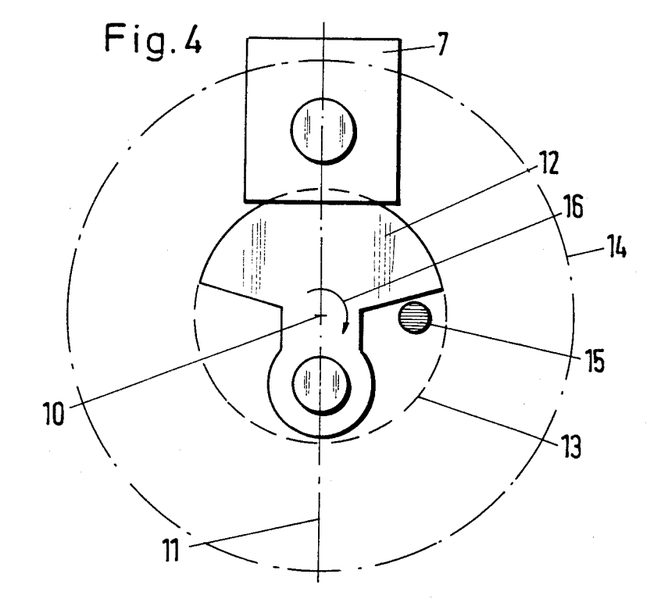
FIG. 4 is a simplified schematic of the crankshaft of FIG. 3 viewed in the direction of the crankshaft axis.

The embodiment shown in FIGS. 3 and 4 has an imbalancing weight 15 in the fan wheel 14, which, with respect to the intended direction of rotation 16 of the crankshaft 9, is disposed in a position 270° after top dead center (that is, the top dead center position of the piston 7). The imbalancing weight 15 here is accordingly disposed perpendicularly to and is spaced from the cylinder axis 11 in both bottom dead center and top dead center positions of the piston 7. The imbalancing weight 15 disposed spaced from the axis of rotation 10 of the crankshaft 9 generates a static imbalance, that is, a parallel displacement of the centroidal axis of the crankshaft. The embodiment shown here is particularly favorable and simple to manufacture, because the crankshaft 9 with its elements 12, 13 and 14 secured on it are manufactured and balanced in a known manner, after which a predetermined imbalancing weight 15 merely needs to be attached to the fan wheel 14 at the angular position described and with the predetermined spacing with respect to the axis of rotation 10 of the crankshaft. Particularly in the case of crankshafts rotating at high speed, care must be taken to adhere to an accurate spacing between the imbalancing weight 15 and the axis of rotation 10; the angular position about the axis of rotation 10 has a considerably larger range of tolerance.

Figure 5:
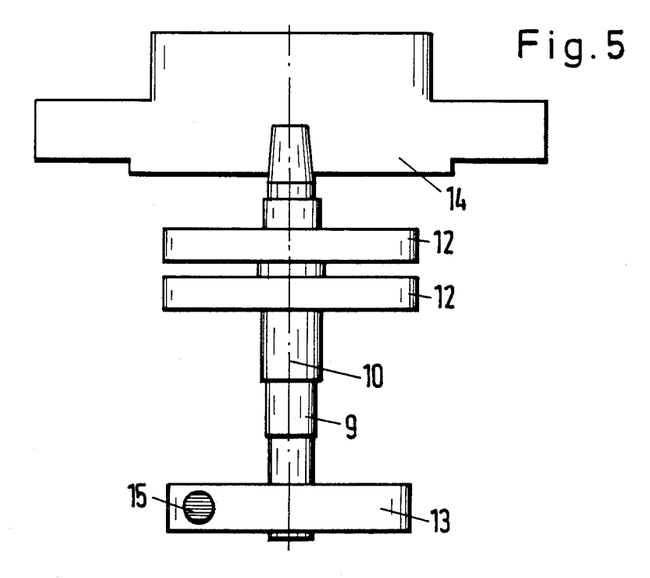
FIG. 5 is a view corresponding to FIG. 3 with a different arrangement of the imbalancing mass.
Figure 6:
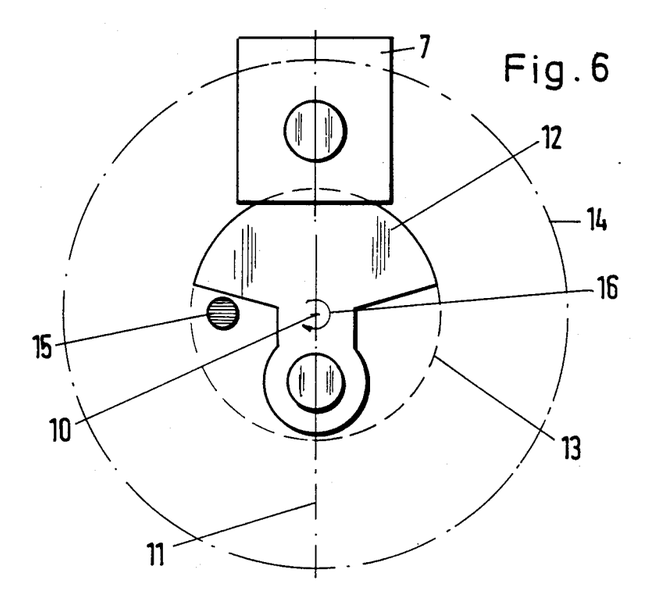
FIG. 6 is a simplified schematic of the embodiment of FIG. 5 in a view corresponding to that of FIG. 4.

FIGS. 5 and 6 show an embodiment in which an imbalancing weight 15 is attached to the clutch 13, which rotates along with the crankshaft 9. The imbalancing weight 15 must be attached to a part of the clutch 13 that during operation rotates with the crankshaft 9. In this embodiment, the weight 15 is attached 90° after top dead center, with respect to the intended direction of rotation 16 of the crankshaft 9 and is spaced from the crankshaft axis of rotation 10. As a result, a static imbalance is likewise provided, which during operation brings about a reduction of the vibrations transmitted to the handles 4 and 5.

Figure 7:
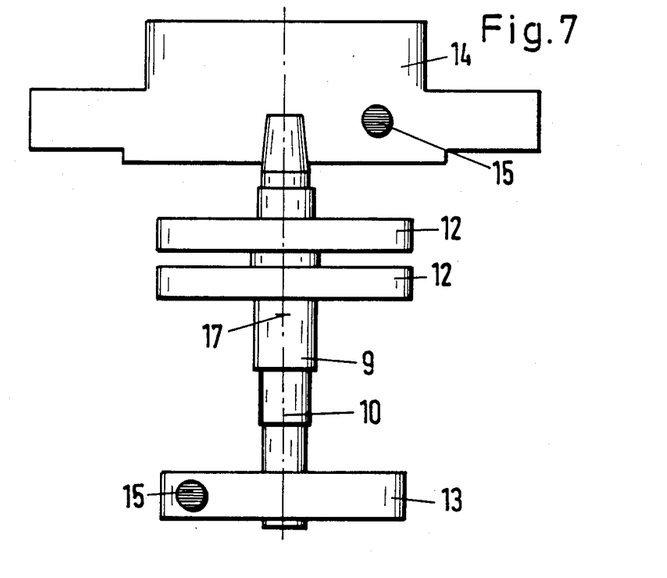
FIG. 7 shows another embodiment for arranging the imbalancing masses.
Figure 8:
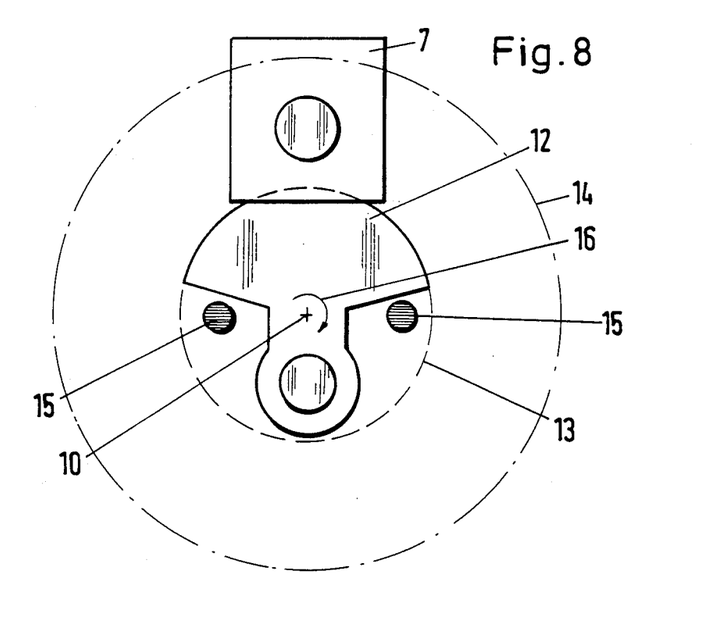
FIG. 8 shows the embodiment of FIG. 7 in a view corresponding to that of FIG. 4.

The embodiment shown in FIGS. 7 and 8 has a fan wheel 14 having an imbalancing weight 15 as in the embodiment of FIGS. 3 and 4 and a clutch 13 having an imbalancing weight 15 as in the above-described embodiment of FIGS. 5 and 6. The imbalancing weights 15 are attached in the same manner as described above to the crankshaft 9, the fan wheel 14 having the imbalancing weight 15 disposed 270° after top dead center and the clutch 13 having the imbalancing weight 15 disposed 90° after top dead center. The imbalancing weights 15 have the same mass and are disposed spaced by the same distance from the axis of rotation 10, and correspondingly, a smaller mass with a greater axial spacing distance, or a larger mass having a lesser axial spacing distance may be provided. In this embodiment, the crankshaft 9 along with the elements 12 to 14 mounted thereon is statically balanced—aside from the balancing masses in the crank webs—except for a tolerance dictated by manufacturing conditions. By means of the two imbalancing weights 15, a purely dynamic imbalance is provided; that is, the gravity axis of the crankshaft is rotated about the center of gravity 17, so that upon rotation of the crankshaft 9, a revolving torque about the center of gravity 17 and also about the cylinder axis 11 is generated. By means of this dynamic imbalance, which is defined in terms of magnitude and position, vibration in the handles 4 and 5 during tool operation is reduced considerably.

Figure 9:
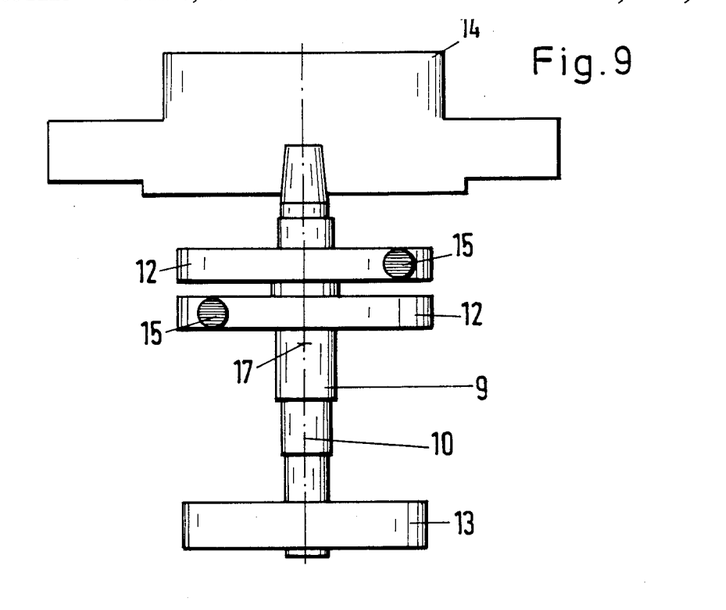
FIG. 9 shows an embodiment in which the imbalancing masses are disposed in the crank arms.
Figure 10:
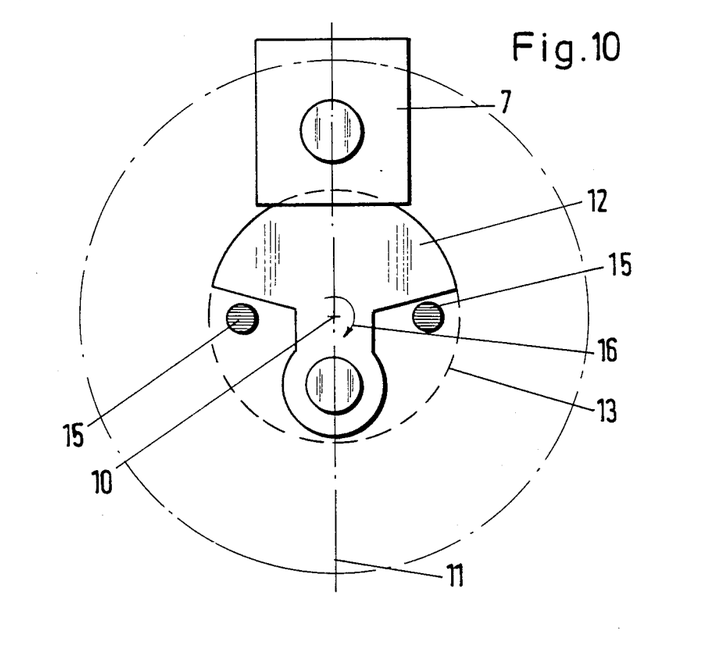
FIG. 10 shows the embodiment of FIG. 9 in a view corresponding to that of FIG. 4.

FIGS. 9 and 10 show an embodiment in which a purely dynamic imbalance, defined in terms of quantity and position, is generated by a means of two imbalancing weights 15 offset by 180° with respect to the axis of rotation 10. The imbalancing weights 15 in this embodiment are attached to respective crank webs 12. Here also, upon rotation of the crankshaft 9, a revolving torque about the center of gravity 17 and the cylinder axis 11 is generated, as a result of which the vibrations in the handles 4 and 5 are reduced.

Figure 11:
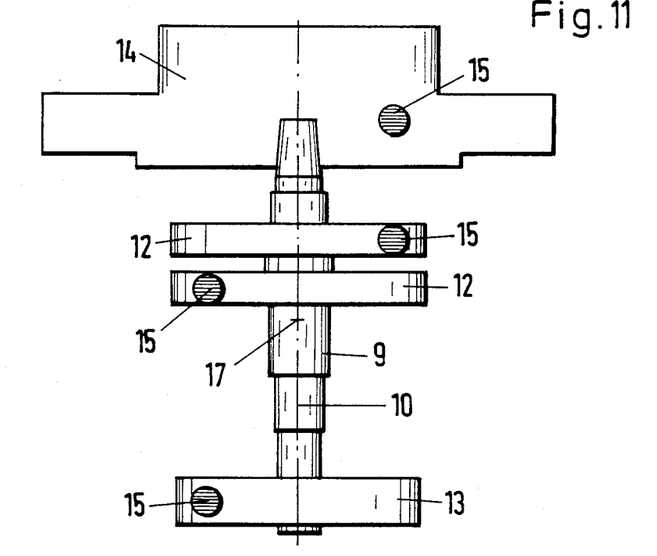
FIG. 11 shows an embodiment in which four imbalancing masses are provided on the crankshaft.
Figure 12:
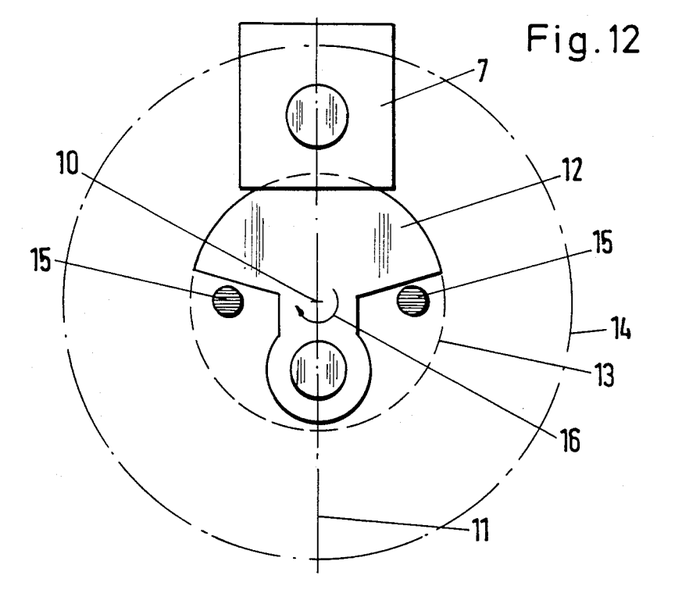
FIG. 12 shows the embodiment of FIG. 11 in a view corresponding to that of FIG. 4.

The embodiment of FIGS. 11 and 12 is a combination of the embodiment of FIGS. 7 and 8 and the embodiment of FIGS. 9 and 10; here, a purely dynamic imbalance is brought about by means of four imbalancing weights 15. The imbalancing weights 15 are attached as follows in this embodiment: imbalancing weight 15 in the fan wheel 14, 270° after top dead center; imbalancing weight 15 in the one crank web 12 facing toward the fan wheel 14, 270° after top dead center; imbalancing weight 15 in the other crank web 12 facing toward the clutch 13, 90° after top dead center; and, imbalancing weight 15 of the clutch 13, 90° after top dead center. Also, in this embodiment a revolving torque about the center of gravity 17 of the rotational body as well as about the cylinder axis 11 is generated during operation to reduce the vibration that is generated by the drive unit 1 and transmitted to the housing 3 or to the handles 4 and 5 via the anti-vibration elements 2.

Figure 13:
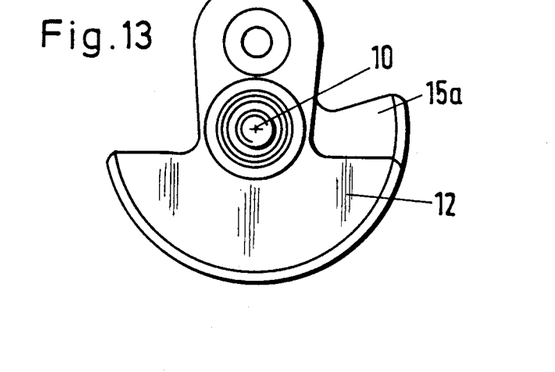
FIG. 13 shows a structural configuration of a crank arm having one imbalancing weight or recess.

FIG. 13 shows a structural provision for attaching an imbalancing weight 15a to a crank web 12 by way of example. The crank web shown here could for example be used for the crank web 12 facing the clutch 13 in the embodiment of FIGS. 11 and 12. At top dead center position, the imbalancing weight 15 is mounted approximately at the level of the axis of rotation 10 on the top of one web half and is suitably cast directly along with the web during manufacture. The mass of the imbalancing weight can be matched accurately by suitable routing or trimming effected by milling. The imbalancing weight 15a is disposed on the right-hand side of the web in FIG. 13; by providing an identical imbalancing weight 15a on the left-hand side of a further crank web 12, a purely dynamic imbalance can be generated.

Figures 14, 15:
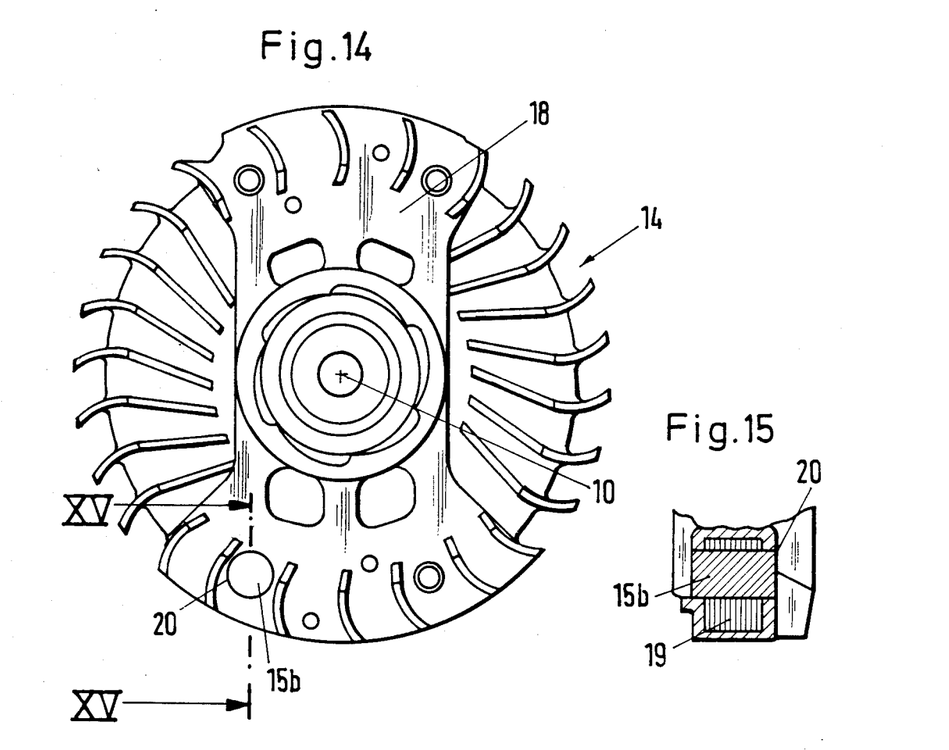
FIG. 14 is a plan view on a fan wheel having an imbalancing mass.
FIG. 15 is a section taken along the line XV—XV of FIG. 14.

FIGS. 14 and 15 show the structural embodiment of a fan wheel having an imbalancing weight such as that already described in connection with FIGS. 3 and 4. The fan wheel 14 shown here has a magnet, not shown here, on its outer circumference, which during operation travels past a coil disposed in a stationary manner in the tool housing and in this manner induces the current required for electrical ignition. The magnet in this embodiment is formed by a magnet packet, which in the view shown in FIG. 14 is disposed approximately on top of the fan wheel. The magnet packet is seated in a cap 18 that is secured to one flat side of the fan wheel 14. The cap 18 carries a balancing weight 19, which with respect to the axis of rotation 10 of the fan wheel (and of the crankshaft) is disposed offset by 180° from the magnet. The fan wheel balanced in this way is provided with an additional imbalancing weight 15b, which is provided in a bore 20 in the cap 18. This bore may for instance be compound-filled with lead or some other material, so as to produce the desired imbalancing weight. The imbalancing weight 15b shown here is located, in the installed state, at a position of 270° after top dead center. With the embodiment shown here, an imbalancing weight 15 can be attached in the simplest and least expensive manner, and neither the fan wheel 14 nor the cap 18 secured on it need be structurally changed; all that has to be done is to provide a bore 20 in the cap, and this can be done simply and inexpensively.

The above-described embodiments show only some of the numerous possible dispositions of one or more imbalancing weights. An imbalancing weight 15 for generating a static imbalance, such as has been described in conjunction with FIGS. 3 and 4, 5 and 6, and 14 and 15, amounts to 10 g by way of example, in the case of the single-cylinder engine described here, with a spacing from the axis of crankshaft rotation of 20 mm, so that a static imbalance of 200 g mm is attained. The resultant dynamic imbalance (moment about the center of gravity) amounts to approximately 14,000 g mm$^2$. The crankshaft embodied in this manner is designed for a maximum speed of 12,000 rpm and a speed under load of 9,000 rpm. Especially in the case of high engine speed, the defined imbalance provided herein has an advantageous effect; it is here that the reduction of vibration in the handles 4 and 5 is the greatest, as compared with a balanced engine. The numerical values given here for the magnitude of imbalance are to be understood as solely by way of example; they should be matched individually to the engine size, output, rpm, and so forth.

With tools having only one well-defined crank web inside the crankshaft housing, and in which the other crank web is seated on the shaft outside the crankshaft housing, the crank web located on the outside can be integrated with the fan wheel. In this embodiment, it may be advantageous to embody the crank web integrated with the fan wheel as somewhat heavier, so as to obtain the defined imbalance. This imbalance can then, like the crank web integrated with the fan wheel, be disposed approximately 180° after top dead center. This embodiment has proved particularly suitable for small engines.

By means of the imbalance of defined magnitude and position on the crankshaft, or its elements rotating with it, a considerable reduction of vibration in the handle is attained in tools of the above-described type, in which the drive unit is connected directly or indirectly to the handle or handles by means of stamping elements. The structural provisions necessary to attain this effect will be appreciated as being particularly simple and they entail virtually no additional cost.

It is understood that the foregoing description is that of the preferred embodiments of the invention and that various changes and modifications may be made thereto without departing from the spirit and scope of the invention as defined in the appended claims.

What is claimed is:

1. A handheld portable tool such as a chain saw, cutoff machine, brushcutter or the like, comprising:
   a drive assembly wherein vibrations are generated;
   at least one handle for manually holding and guiding the tool;
   damping means interconnecting said drive assembly and said handle for attenuating said vibrations so as to transmit attenuated vibrations to a person holding the tool at said handle;
   said drive assembly including a single-cylinder internal combustion engine having a reciprocating piston and a cylinder within which said piston reciprocates during the operation thereof;
   said cylinder defining a longitudinal axis and said piston moving between a top dead center position and a bottom dead center position as it actuates said crankshaft;
   a crankshaft defining an axis of rotation and being connected to said piston and a plurality of parts fixedly attached to said crankshaft to conjointly define a unit therewith; and, a counterbalancing structure disposed on said unit for counterbalancing said piston thereby equalizing mass for said piston during operation of said engine;
   imbalance means disposed on said unit at a predetermined position thereon to effect an imbalance of said crankshaft and being of a predetermined quantity for causing a reduction of said attenuated vibrations sensed in said handle; and,
   said imbalance means being an imbalance weight mounted on said unit so as to be at an angle with respect to said longitudinal axis of from 45° to 135° when said piston is at said top dead center position.

2. The handheld portable tool of claim 1, said imbalance means being static.

3. The handheld portable tool of claim 1, said imbalance means being dynamic.

4. The handheld portable tool of claim 1, said angle being approximately 90°.

5. The handheld portable tool of claim 1, wherein one of said parts is a fan wheel, said imbalance means being disposed on said fan wheel.

6. The handheld portable tool of claim 1, wherein one of said parts is a clutch rotor, said imbalance means being disposed on said clutch rotor.

7. The handheld portable tool of claim 1, wherein two of said parts are respective crank webs, said imbalance means being disposed on one of said crank webs.

8. A handheld portable tool such as a chain saw, cutoff machine, brushcutter or the like, comprising:
   a drive assembly wherein vibrations are generated;
   at least one handle for manually holding and guiding the tool;
   damping means interconnecting said drive assembly and said handle for attenuating said vibrations so as to transmit attenuated vibrations to a person holding the tool at said handle;
   said drive assembly including: a single-cylinder internal combustion engine having a reciprocating piston and a cylinder within which said piston reciprocates during the operation thereof;
   said cylinder defining a longitudinal axis and said piston moving between a top dead center position and a bottom dead center position as it actuates said crankshaft;
   a crankshaft defining an axis of rotation and being connected to said piston and a plurality of parts fixedly attached to said crankshaft to conjointly define a unit therewith; and, a counterbalancing structure disposed on said unit for counterbalancing said piston thereby equalizing mass for said piston during operation of said engine;
   imbalance means disposed on said unit at a predetermined position thereon to effect an imbalance of said crankshaft and being of a predetermined quantity for causing a reduction of said attenuated vibrations sensed in said handle; and,
   said imbalance means being at an angle with respect to said longitudinal axis of from 45° to 135° when said piston is at said top dead center position.

9. The handheld portable tool of claim 8, said angle being approximately 90°.

10. A handheld portable tool such as a chain saw, cutoff machine, brushcutter or the like, comprising:
    a drive assembly wherein vibrations are generated;
    at least one handle for manually holding and guiding the tool;
    damping means interconnecting said drive assembly and said handle for attenuating said vibrations so as to transmit attenuated vibrations to a person holding the tool at said handle;
    said drive assembly including: a single-cylinder internal combustion engine having a reciprocating piston and a cylinder within which said piston reciprocates during the operation thereof;
    said cylinder defining a longitudinal axis and said piston moving between a top dead center position and a bottom dead center position as it actuates said crankshaft;
    a crankshaft defining an axis of rotation and being connected to said piston and a plurality of parts fixedly attached to said crankshaft to conjointly define a unit therewith; and, a counterbalancing structure disposed on said unit for counterbalancing said piston thereby equalizing mass for said piston during operation of said engine;
    imbalance means disposed on said unit at a predetermined position thereon to effect an imbalance of said crankshaft and being of a predetermined quantity for causing a reduction of said attenuated vibrations sensed in said handle;
    two of said parts being respective crank webs; and,
    said imbalance means being two imbalance weights mounted on corresponding ones of said crank webs so as to be displaced 180° from each other with respect to said axis of rotation.

11. A handheld portable tool such as a chain saw, cutoff machine, brushcutter or the like, comprising:
    a drive assembly wherein vibrations are generated;
    at least one handle for manually holding and guiding the tool;
    damping means interconnecting said drive assembly and said handle for attenuating said vibrations so as to transmit attenuated vibrations to a person holding the tool at said handle;

said drive assembly including: a single-cylinder internal combustion engine having a reciprocating piston and a cylinder within which said piston reciprocates during the operation thereof;

said cylinder defining a longitudinal axis and said piston moving between a top dead center position and a bottom dead center position as it actuates said crankshaft;

a crankshaft defining an axis of rotation and being connected to said piston and a plurality of parts fixedly attached to said crankshaft to conjointly define a unit therewith; and, a counterbalancing structure disposed on said unit for counterbalancing said piston thereby equalizing mass for said piston during operation of said engine;

imbalance means disposed on said unit at a predetermined position thereon to effect an imbalance of said crankshaft and being of a predetermined quantity for causing a reduction of said attenuated vibrations sensed in said handle;

two of said parts being respective crank webs; and, said imbalance means being formed on corresponding ones of said crank webs so as to be displaced 180° from each other with respect to said axis of rotation.

12. A handheld portable tool such as a chain saw, cutoff machine, brushcutter or the like, comprising:

a drive assembly wherein vibrations are generated;

at least one handle for manually holding and guiding the tool;

damping means interconnecting said drive assembly and said handle for attenuating said vibrations so as to transmit attenuated vibrations to a person holding the tool at said handle;

said drive assembly including: a single-cylinder internal combustion engine having a reciprocating piston and a cylinder within which said piston reciprocates during the operation thereof;

said cylinder defining a longitudinal axis and said piston moving between a top dead center position and a bottom dead center position as it actuates said crankshaft;

a crankshaft defining an axis of rotation and being connected to said piston and a plurality of parts fixedly attached to said crankshaft to conjointly define a unit therewith; and, a counterbalancing structure disposed on said unit for counterbalancing said piston thereby equalizing mass for said piston during operation of said engine;

imbalance means disposed on said unit at a predetermined position thereon to effect an imbalance of said crankshaft and being of a predetermined quantity for causing a reduction of said attenuated vibrations sensed in said handle;

said crankshaft defining a rotational axis and two of said parts being respective crank webs and two further ones of said parts being as fan wheel and a clutch rotor, respectively; and, said imbalance means comprising four imbalance structures disposed on respective ones of said parts, said imbalance structures on said crank webs being displaced 180° from each other with respect to said rotational axis, and said imbalance structures on said fan wheel and said clutch rotor being displaced 180° from each other with respect to said rotational axis.

13. A handheld portable tool such as a chain saw, cutoff machine, brushcutter or the like, comprising:

a drive assembly wherein vibrations are generated;

at least one handle for manually holding and guiding the tool;

damping means interconnecting said drive assembly and said handle for attenuating said vibrations so as to transmit attenuated vibrations to a person holding the tool at said handle;

said drive assembly including: a single-cylinder internal combustion engine having a reciprocating piston and a cylinder within which said piston reciprocates during the operation thereof;

said cylinder defining a longitudinal axis and said piston moving between a top dead center position and a bottom dead center position as it actuates said crankshaft;

a crankshaft defining an axis of rotation and being connected to said piston and a plurality of parts fixedly attached to said crankshaft to conjointly define a unit therewith; and, a counterbalancing structure disposed on said unit for counterbalancing said piston thereby equalizing mass for said piston during operation of said engine;

imbalance means disposed on said unit at a predetermined position thereon to effect an imbalance of said crankshaft and being of a predetermined quantity for causing a reduction of said attenuated vibrations sensed in said handle; and, two of said parts being a crank web and a fan wheel, respectively; said imbalancing means including an imbalance structure associated with said crankshaft and said plurality of parts, said imbalance structure having a predetermined position and being of a predetermined amount, said imbalance structure further lying approximately in the direction of said longitudinal axis of said cylinder when said piston is at said top dead center position.

* * * * *

UNITED STATES PATENT AND TRADEMARK OFFICE
CERTIFICATE OF CORRECTION

PATENT NO. : 4,836,297
DATED : June 6, 1989
INVENTOR(S) : Wolfgang Dorner, Helmut Lux and Reinhold Fink It is certified that error appears in the above-identified patent and that said Letters Patent is hereby corrected as shown below:

On the title page, under "ABSTRACT", line 2: delete "handle" and substitute -- handles -- therefor.

In column 5, line 49: delete "of" and substitute -- in -- therefor.

In column 7, line 22: delete "including" and substitute -- including: -- therefor.

In column 10, line 5: delete "as" and substitute -- a -- therefor.

Signed and Sealed this

Twenty-seventh Day of March, 1990

Attest:

JEFFREY M. SAMUELS

*Attesting Officer*  *Acting Commissioner of Patents and Trademarks*